US008927901B2

(12) United States Patent
Stol et al.

(10) Patent No.: US 8,927,901 B2
(45) Date of Patent: Jan. 6, 2015

(54) BURIED-ARC WELDING OF METAL WORK PIECES WITH THROUGH-THE-ARC SEAM TRACKING

(75) Inventors: Israel Stol, Pittsburgh, PA (US); Floyd Thompson, Tomball, TX (US); Richard S. Dulski, Cheswick, PA (US)

(73) Assignee: Alcoa Inc., Pittsburgh, PA (US)

( * ) Notice: Subject to any disclaimer, the term of this patent is extended or adjusted under 35 U.S.C. 154(b) by 1270 days.

(21) Appl. No.: 12/338,361

(22) Filed: Dec. 18, 2008

(65) Prior Publication Data
US 2009/0230106 A1 Sep. 17, 2009

Related U.S. Application Data

(60) Provisional application No. 61/037,199, filed on Mar. 17, 2008.

(51) Int. Cl.
| | |
|---|---|
| *B23K 9/12* | (2006.01) |
| *B23K 9/10* | (2006.01) |
| *B23K 9/00* | (2006.01) |
| *B23K 9/28* | (2006.01) |
| *B23K 9/18* | (2006.01) |
| *B23K 9/127* | (2006.01) |
| *B23K 9/173* | (2006.01) |

(52) U.S. Cl.
CPC .............. *B23K 9/173* (2013.01); *B23K 9/186* (2013.01); *B23K 2201/18* (2013.01); *B23K 9/127* (2013.01)
USPC ............ 219/124.22; 219/121.11; 219/124.02; 219/124.03; 219/124.1; 219/124.33; 219/125.11; 219/130.01; 219/130.31; 219/130.32; 219/130.33; 219/136; 219/137 R; 219/137.2; 219/137.71

(58) Field of Classification Search
CPC ....................................................... B23K 9/073
USPC ............ 219/121.11, 125.12, 130.01, 130.31, 219/130.32, 130.33, 136, 137 R, 137.2, 219/137.71, 124.01–124.5
See application file for complete search history.

(56) References Cited

U.S. PATENT DOCUMENTS

| | | | | |
|---|---|---|---|---|
| 3,102,948 | A * | 9/1963 | McCampbell et al. | ... 219/137 R |
| 3,264,447 | A * | 8/1966 | Agnew | ...... 219/124.02 |
| 3,341,686 | A * | 9/1967 | Sidbeck | .................. 219/124.03 |
| 3,562,487 | A * | 2/1971 | Nelson et al. | ............ 219/130.32 |
| 3,581,052 | A * | 5/1971 | Milton | ...................... 219/130.21 |
| 3,602,687 | A * | 8/1971 | Pollock | ....................... 219/137.7 |
| 3,612,818 | A * | 10/1971 | Bechtle et al. | ........... 219/137.71 |
| 3,679,866 | A * | 7/1972 | Arikawa et al. | ........... 219/137 R |
| 3,732,393 | A * | 5/1973 | Wilkens et al. | ............ 219/137 R |
| 3,849,584 | A * | 11/1974 | Paton et al. | ...................... 373/21 |
| 3,980,802 | A * | 9/1976 | Paton et al. | ...................... 373/18 |
| 4,037,078 | A * | 7/1977 | Oishi et al. | ................. 219/137 R |
| 4,091,258 | A * | 5/1978 | Kano et al. | ................. 219/125.12 |
| 4,157,923 | A * | 6/1979 | Yen et al. | ........................ 148/512 |
| 4,507,541 | A * | 3/1985 | Fourre et al. | ............. 219/124.34 |
| 4,695,329 | A * | 9/1987 | Hayashi et al. | ............... 148/549 |
| 4,733,051 | A * | 3/1988 | Nadeau et al. | ........... 219/130.21 |
| 4,902,359 | A * | 2/1990 | Takeuchi et al. | .............. 148/222 |
| 5,510,596 | A * | 4/1996 | Xu et al. | ................. 219/130.01 |

(Continued)

*Primary Examiner* — Dana Ross
*Assistant Examiner* — Gyounghyun Bae
(74) *Attorney, Agent, or Firm* — Greenberg Traurig LLP (57) ABSTRACT

One embodiment of the present invention relates to a system for buried-arc welding with thru-the-arc seam tracking. Another embodiment of the present invention relates to a method for buried-arc welding with thru-the-arc seam tracking.

15 Claims, 9 Drawing Sheets

(56) References Cited

U.S. PATENT DOCUMENTS

| | | | |
|---|---|---|---|
| 5,756,967 A | 5/1998 | Quinn et al. | |
| 5,811,756 A * | 9/1998 | Horita et al. | 219/137 WM |
| 5,864,115 A * | 1/1999 | Ikeda et al. | 219/130.21 |
| 6,031,203 A * | 2/2000 | Suzuki et al. | 219/130.01 |
| RE36,926 E * | 10/2000 | Austin et al. | 219/130.21 |
| 6,150,631 A * | 11/2000 | Sugitani et al. | 219/124.34 |
| 6,155,475 A * | 12/2000 | Ekelof et al. | 228/225 |
| 6,274,845 B1 * | 8/2001 | Stava et al. | 219/125.12 |
| 6,392,184 B1 * | 5/2002 | Yokota et al. | 219/74 |
| 6,429,404 B1 | 8/2002 | Suzuki | |
| 6,670,571 B2 * | 12/2003 | Dance | 219/121.18 |
| 6,828,526 B1 * | 12/2004 | Stol et al. | 219/137 R |
| 7,371,994 B2 * | 5/2008 | Stol | 219/137 R |
| 2003/0000931 A1 * | 1/2003 | Ueda et al. | 219/124.02 |
| 2004/0226931 A1 * | 11/2004 | Stol et al. | 219/137 R |

\* cited by examiner

BURIED-ARC WELDING OF METAL WORK PIECES WITH THROUGH-THE-ARC SEAM TRACKING

RELATED APPLICATIONS

This application claims the benefit of U.S. Provisional Application Ser. No. 61/037,199, filed Mar. 17, 2008, which is incorporated herein by reference in its entirety.

FIELD OF THE INVENTION

One embodiment of the present invention relates to a system for buried-arc welding with thru-the-arc seam tracking.

Another embodiment of the present invention relates to a method for buried-arc welding with thru-the-arc seam tracking.

BRIEF DESCRIPTION OF THE DRAWINGS

FIG. 2 shows principles of thru-the-arc seam tracking, based on continuously measuring and comparing variations in welding voltage and current that correspond to changes in arc length, which is affected by the arc's lateral position in the joint. Joint sidewalls (that is, sidewall 201A of part A 201 and sidewall 203A of part B 203) act as electrical "obstacles" (or references) to the arc 207, which gets shorter when placed more closely to (or onto) sidewall 201A/sidewall 203A. As seen, electrode filler wire 209 is used. Of note, arc 207 (and electrode filler wire 209) are shown in three different positions in this view. Of further note, at the extreme right lateral position arc 207 is shown as overlapping sidewall 201A and at the extreme left lateral position arc 207 is shown as overlapping sidewall 203A. Sidewall 201A and sidewall 203A form the gap under which is disposed part C 205 and into which arc 207 is placed. Both sidewall 201A and sidewall 203A are features of plate A 201 and plate B 203, respectively, and both sidewall 201A and sidewall 203A exist prior to application of arc 207.

FIGS. 3A and 3B are cross-sectional views of a weld seam running essentially perpendicular to the page.

As seen in FIG. 4A, part 401 abuts part 403, with no gap between the two. As such, parts 401,403 present to the arc no sidewalls to permit use of the conventional thru-the-arc seam tracking technique. Further, as seen in FIG. 4B, while parts 421,423 present sidewalls (see, the "V" gap in this FIG. 4B), the sidewall are insufficient (e.g., too far apart) to permit use of the conventional thru-the-arc seam tracking technique.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, any trademarks, company names and the like referred to in the present application are intended to be illustrative, and not restrictive. Further still, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

A Gas Metal Arc Welding (GMAW) process is based on establishing an electric arc between the tip of a consumable filler wire and the base-metals (parts) being welded.

A Gas Tungsten Arc Welding (GTAW) process is based on establishing an electric arc between the tip of a non-consumable Tungsten electrode and the base-metals (parts) being welded, while adding a filler wire directly into the arc and/or the molten-pool.

Once the arc is initiated and the molten pool directly underneath it is established, the arc with both of these conventional processes is made to impinge onto the top of the molten pool with limited penetration into the molten pool and the base-metals.

Depending on the configuration and dimensions of the joint (e.g., Lap-Fillet, Vee-Groove, Tee-Fillet and Square Butt), these processes are typically used to weld by depositing single or multiple weld-passes, which in the case of thick joints (e.g., 1 in. thick parts welded through a single Vee groove with a 900 opening vs. a 450 opening) adversely affect the productivity of the processes, amount of filler wire used and the welding heat input into the structures being welded and its associated weld-induced distortion.

Figure 1A:
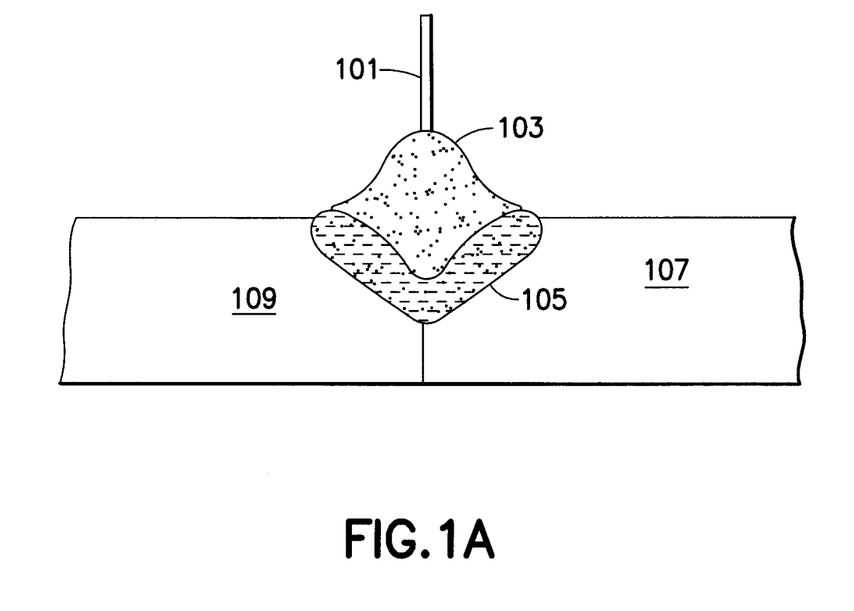
FIGS. 1A and 1B show, respectively, principles of: (1A) gas metal arc welding (GMAW) process; and (1B) gas metal buried-arc welding (GMBAW) process (note that other arc based processes (e.g., gas tungsten arc welding (GTAW), plasma, etc.) can also be used to weld in the buried-arc mode). As seen, in FIG. 1A, electrode filler wire 101 is used and arc 103 produces molten pool 105 by simultaneously melting plate A 107 and plate B 109. Similarly, in FIG. 1B, electrode filler wire 121 is used and arc 123 produces molten pool 125 in plate A 127 and plate B 129.
Figure 1B:
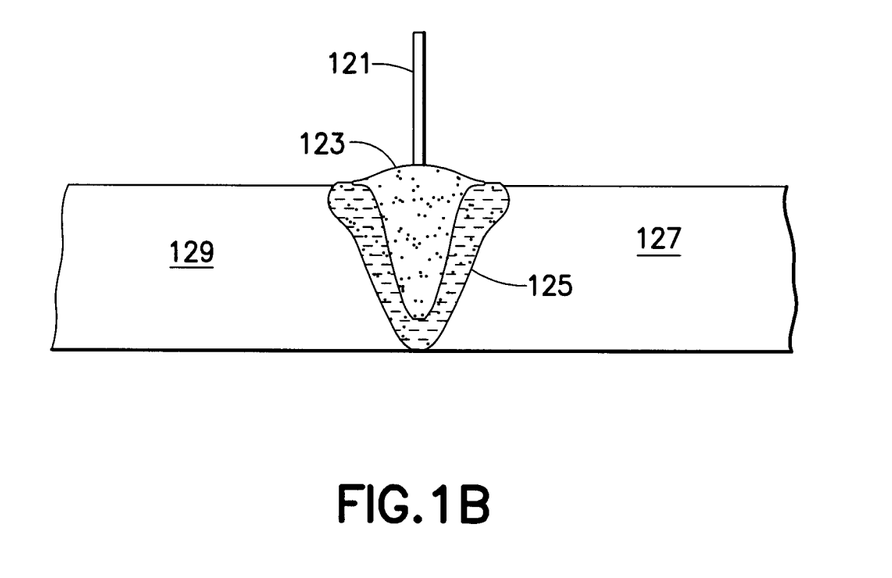

In a conventional "buried-arc" welding mode, use of relatively high welding current-densities in conjunction with the use of certain shielding gases (e.g. He/Ar mixtures, Ar, $Ar/O_2$ and $Ar/O_2/CO_2$), collimates (constricts) the arc and makes it more penetrating than the arcs used with non-buried-arc GMAW and GTAW processes. Unlike a non-buried-arc GMAW and GTAW process in which the arc is essentially maintained above (or only slightly below) the top surfaces (i.e., the work surfaces facing the arc) of the parts being welded, the welding with the more collimated arcs in the buried-arc mode "buries" the arc beneath the top surfaces of the parts being welded and thus makes the arc more penetrating (see, e.g., FIG. 1A vs. FIG. 1B—of note, for a given joint thickness, a depth of the weld nugget will be appreciably deeper for the buried-arc mode versus the non-buried-arc mode; to give one example (which example is intended to be illustrative and not restrictive), for a ½ inch thick Square Butt joint with no gap the weld nugget for the buried-arc mode may be essentially the entire material thickness, while for the non-buried-arc mode the weld nugget may be partially penetrated into the thickness of the joint to a depth, below the top surfaces of the parts being welded, of ⅛ inch to ¼ inch). As mentioned, this mode of welding with deep penetrating arcs is called the "buried-arc" welding mode. The advantages of welding in this buried-arc welding mode compared to the welding in the non-buried-arc mode are typically: a) higher weld productivity realized by reduction of the number of weld passes; b) reduced amount of welding filler wire additions; and c) significant reduction in the weld induced distortion of GMAW and GTAW weldments, which stems from a more balanced distribution of residual stresses about the neutral axes of the joints. The latter is afforded by the deeper weld penetration with this buried-arc mode. In certain cases, the buried-arc welding mode may be used with GMAW in a process that is capable of welding thick (e.g., 0.75-1 in.) straight Square Butt joints and corner joints without any gaps by depositing a single weld pass.

Figure 2:
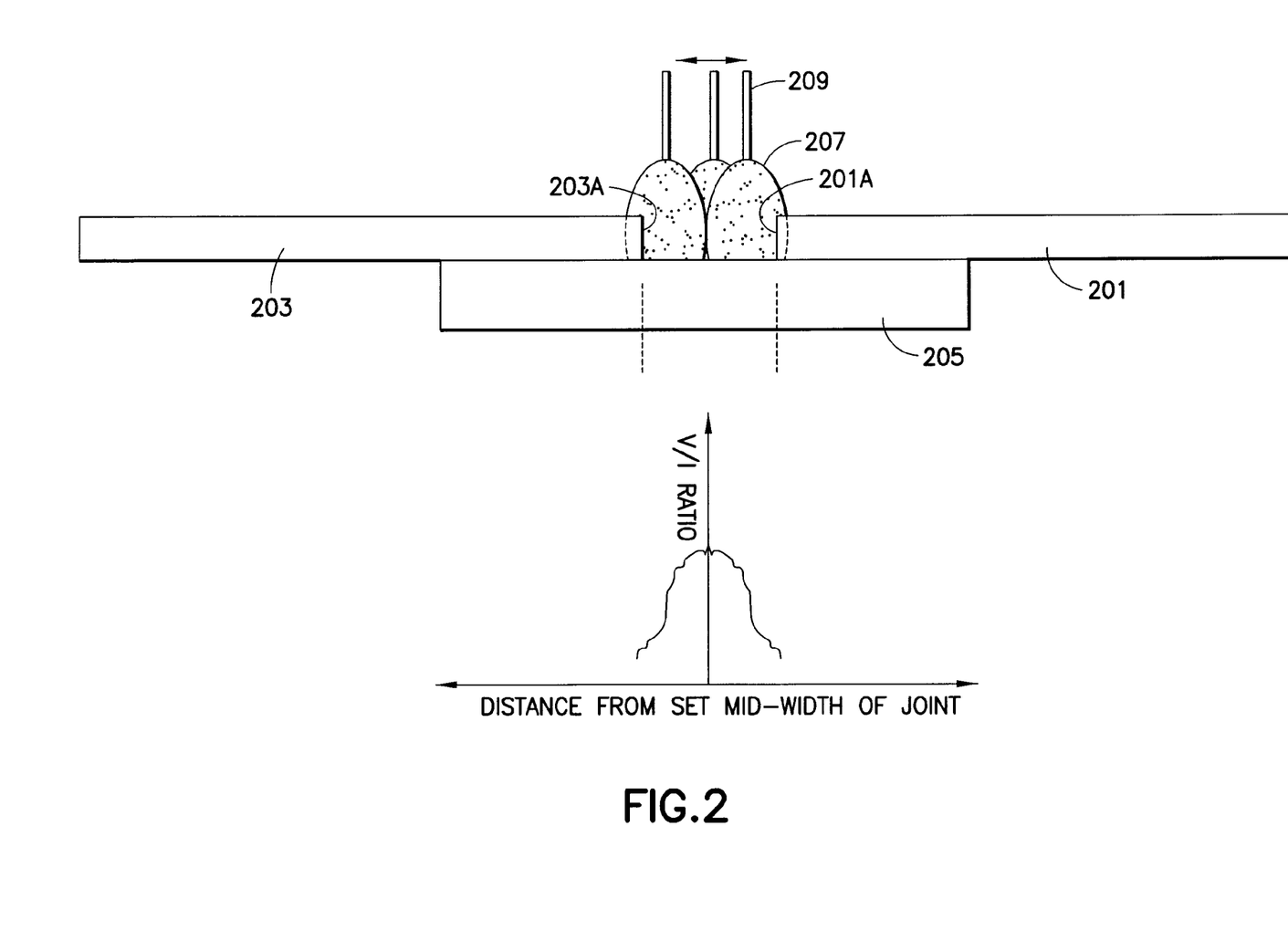

Another conventional technique is to use a "thru-the-arc seam tracking" approach for controlling the lateral position of the arc/wire tip with the GMAW process and arc with the GTAW process, relative to the sidewalls of the joint being welded. This tracking may be achieved by laterally oscillating the welding torch relative to the joint's sidewalls being welded with these two processes (GMAW and GTAW), while "sampling" at high frequency the variations in welding voltage and welding current and computing a ratio between them (e.g., V/I ratio or Impedance), which corresponds to the variations in arc length. The closer the arc is to a joint's sidewall, the lower the V/I ratio becomes (see, e.g., FIG. 2). Since changes in arc length are promptly affected by the position of the arc relative to the joint's sidewall(s) and a set (or pre-programmed) center (or mid-width) of these joints, the measurement of these electric ratios directly corresponds to the position of the arc and/or wire tip in the joint. In other words, the sidewall(s) with this technique can be used as "reference" point(s) to the position of the arc and/or wire tip. The technique has successfully been applied to tracking mechanized GMA welding operations with materials that posses high electrical resistivities (e.g., steels and stainless steels) compared to aluminum. Because aluminum alloys have a relatively low electrical resistivity, the combination of voltage drop across the wire-stick out (i.e., the span of wire between the end of the electric contact tip and the tip of the wire from which the arc emanates) and arc have made it extremely difficult to use this technique for tracking aluminum welding operations.

In this regard, it is noted that one thru-the-arc seam tracking technique applied during arc welding of aluminum that has had success may utilize the following steps:

1. Continuously measure the welding voltage and current as the torch oscillates laterally in a joint and use high speed computing to calculate the electric Impedances corresponding to these voltage and current measurements.
2. At the frequency and amplitude used to oscillate the torch laterally relative to the joint's set mid-width and sidewall(s), computationally determine (or "map") the position of the torch at any instance, based on the electrical Impedances computed at each of these points. This in conjunction with the known profile of the joint, gives an accurate representation of the torch's position relative to the sidewall(s) of the joint, which later (step 4) will enable the estimation of the depth of fusion (or depth of penetration) of the arc into the side wall(s).
3. Once the electric Impedance is calculated at the set mid-width of the joint, all the Impedances calculated to the left and right sides of the set mid-width of joint are accumulated and a slope value is computed for each side of this mid-width.
4. Based on the midpoint Impedance, slope values to the right and left of the joint's mid-width, the change in Impedance is accumulated (integrated) over a sample window which is a percent of the center-left and center-right torch position and is used to estimate the depth of fusion (or depth of penetration) of the arc into the side wall(s).
5. Once the depth of fusion into the side-wall(s) is (are) estimated, compute the approximate position of the torch relative to the set joint's mid-width that will give the targeted depth of fusion into each side-wall(s).
6. Automatically change the lateral position of the torch and/or its oscillation amplitude to achieve the targeted depth of fusion into the side wall(s).

Of note, regarding mapping of the impedance values, in this embodiment they are generated while welding (as opposed, for example, to being obtained during a trial run and replayed on subsequent passes). In one example, the tracking system of this embodiment may use, e.g., the last oscillation cycle impendence maps as an input to a fuzzy-logic tracking algorithm to generate a feed forward control loop for the torch height and width control functions.

Figure 4A:
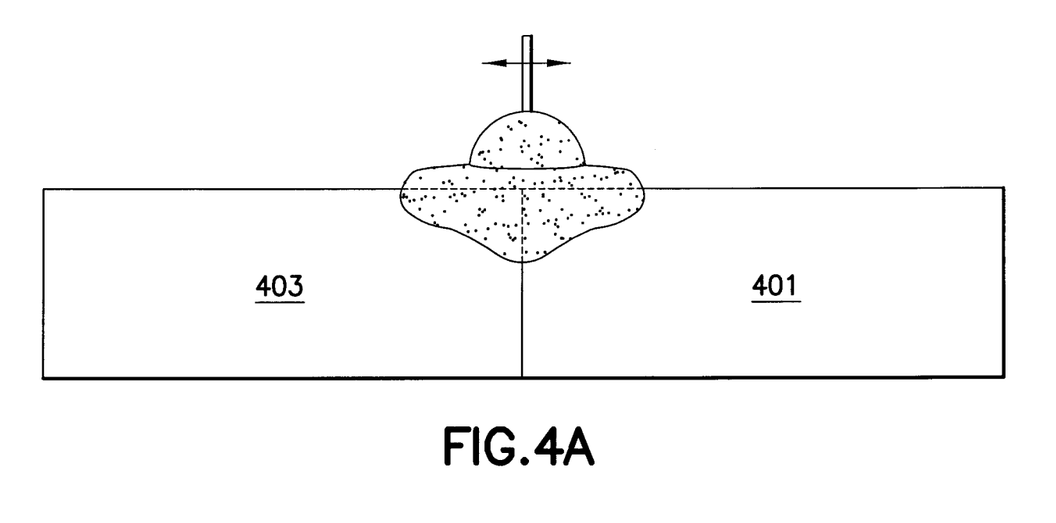
FIGS. 4A and 4B show examples of "reference less" joints which could create difficulty for (or render impossible) the implementation of a conventional thru-the-arc seam tracking technique due to: (i) the absence of exposed sidewalls (see, e.g., FIG. 4A) due to the fact that the arc has limited penetration into the molten pool; (ii) too narrow lateral oscillation amplitude (width) relative to the joint's sidewalls (see, e.g., FIG. 4B); and/or (iii) inadequate placement of set mid-joint oscillation relative to oscillation amplitude (see, e.g., FIG. 4B).
Figure 4B:
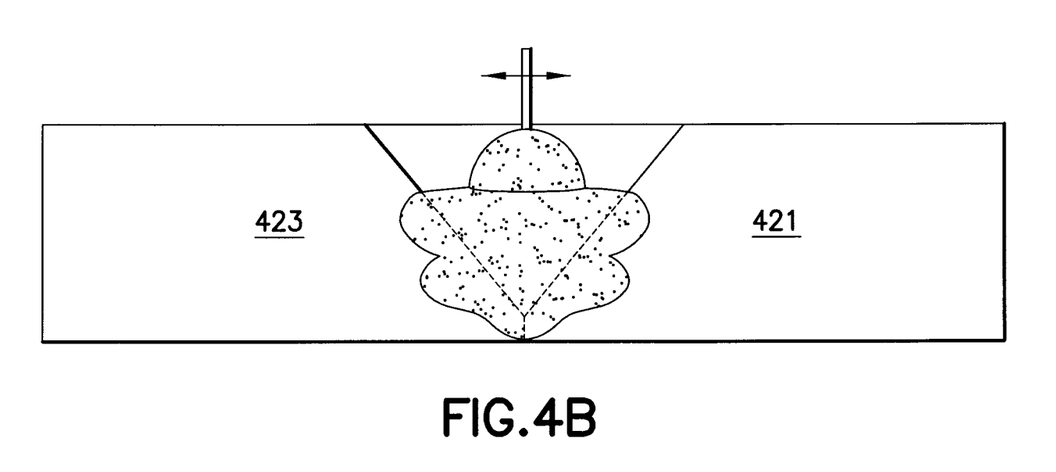
Figure 5:
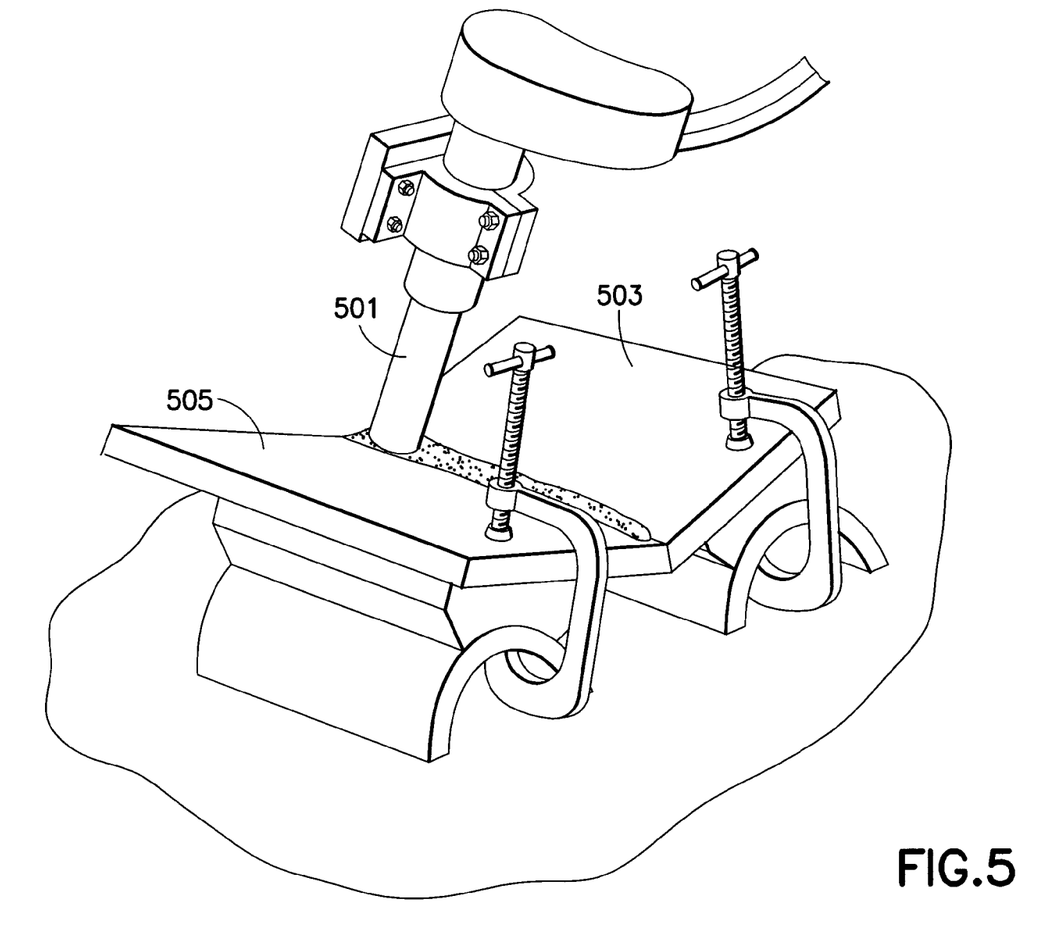
FIG. 5 shows a welding setup on which the inventors have demonstrated the feasibility of buried-arc welding square-butt joints at corners between one inch thick A1-5083-0 plates, with the aid of a thru-the-arc seam tracking method of an embodiment of the present invention. As seen, a computer controlled welding mechanism 501 was used to weld plate 503 and plate 505.
Figure 6:
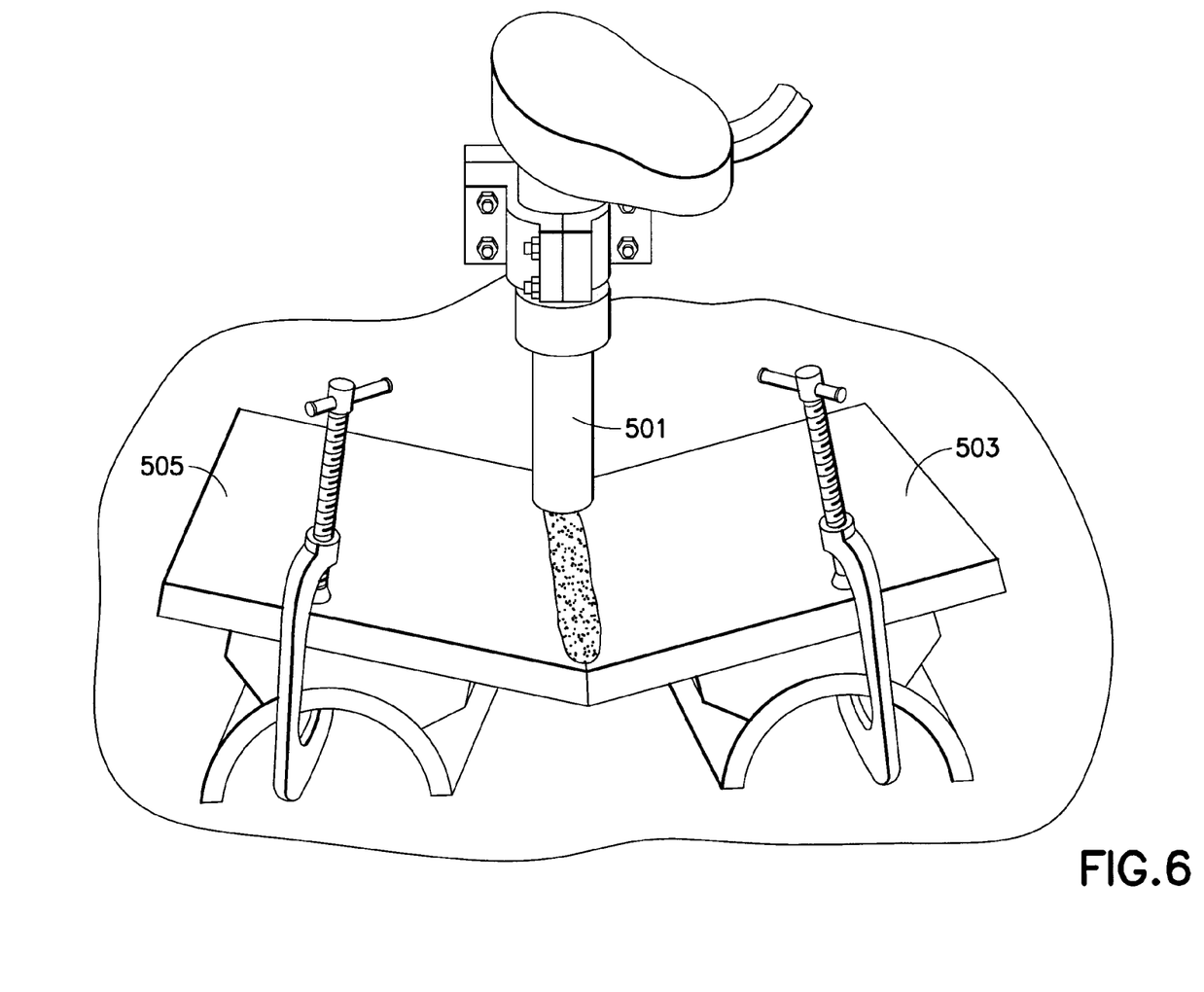
FIG. 6 shows an in-line view of the gas metal buried arc welded corner with and without the thru-the-arc seam tracking of an embodiment of the present invention. As seen, a computer controlled welding mechanism 501 was used to weld plate 503 and plate 505.
Figure 7:
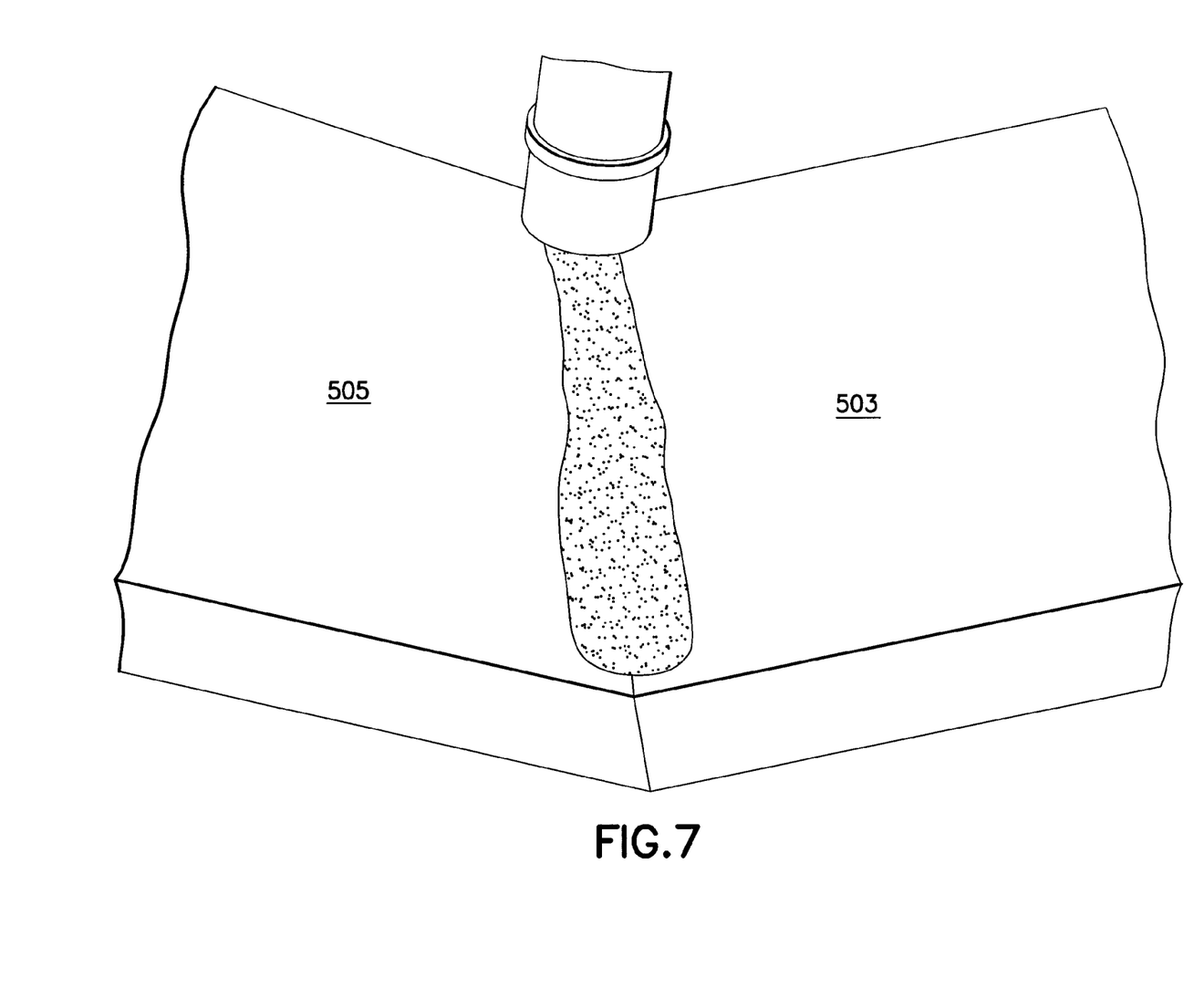
FIG. 7 shows a close up view of the weld of FIG. 6 (showing a close up of the weld deposited with and without the thru-the-arc seam tracking of an embodiment of the present invention).
Figure 8:
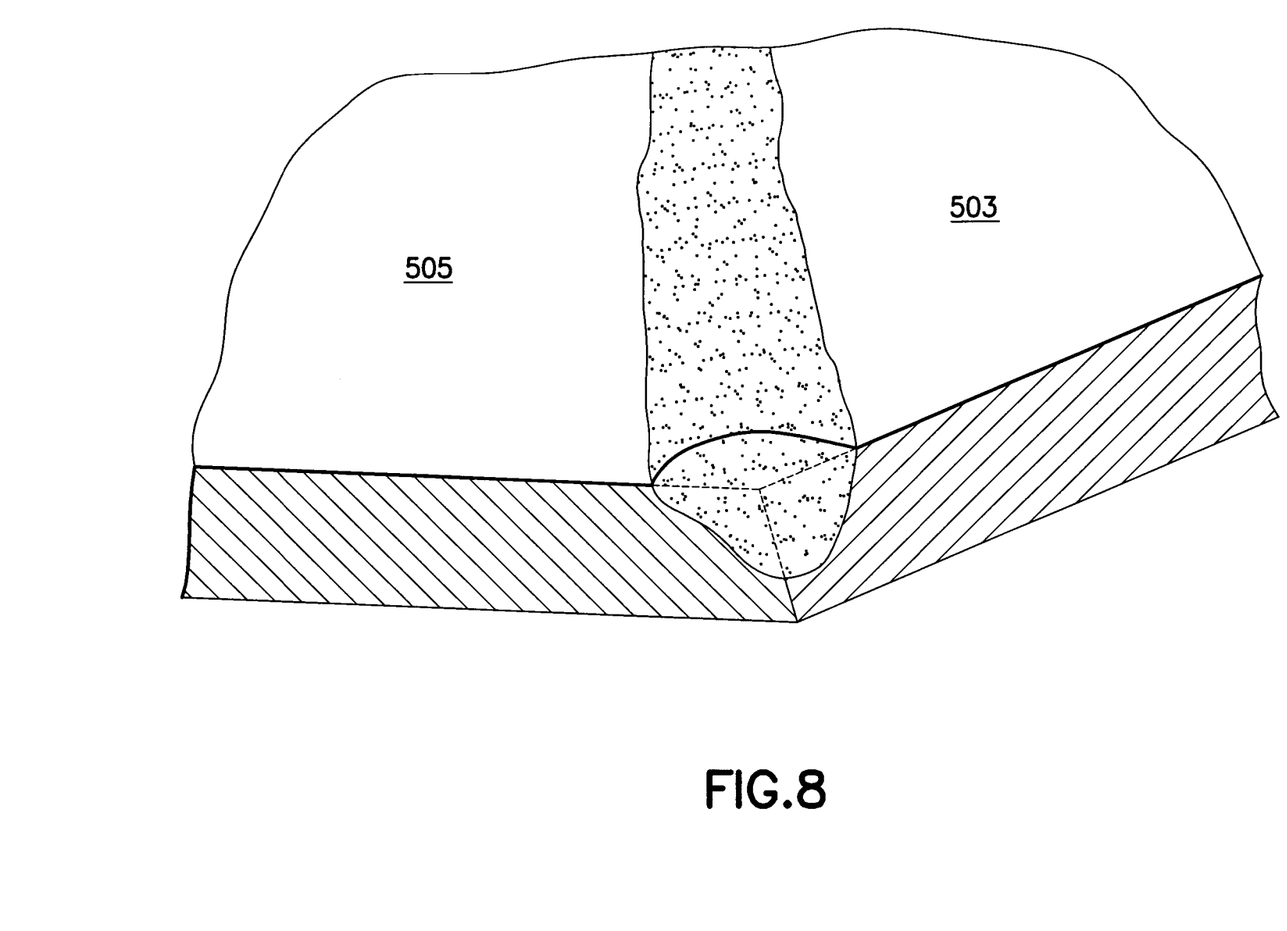
FIG. 8 shows a cross section through a corner square-butt joint, buried-arc welded with the thru-the-arc seam tracking of an embodiment of the present invention.

As mentioned above, for the conventional thru-the-arc seam tracking technique to work (see, e.g., FIG. 2), there must be at least one "obstruction", such as a sidewall, that acts as a "reference" by causing the arc to shorten momentarily when the arc is placed adjacent to the obstruction (e.g., with the intent to melt the obstruction) while altering the welding voltage and current readings at this local (i.e., reduced voltage and/or increased current, lowering the V/I ratio, or electric Impedance). This thru-the-arc seam tracking principle has been used successfully when seam tracking with both GMA and GTA welding process, as long as: a) there are one or two sidewalls available to act as "obstruction(s)" that change the arc length and thus alter the welding voltage and current measured at these locals; b) the arc impinges onto the top of the molten pool with limited penetration into the pool or parts (base-metals) being welded; c) the torch oscillator moves the torch, laterally back and forth in the joint, at an amplitude and frequency that move the welding arc close enough to the sidewall(s) and dwell there long enough to melt it; d) The molten pool is small enough, in depth, height and width, to be brought close enough to each sidewall of the joint in a manner that allows the arc to get close enough to the sidewall and then heat and melt it. However, when these four conditions are absent, the arc becomes "reference less" to alter the welding voltage and current at the joint's sidewall(s) to a discernable (measurable) degree that can be processed and used with this thru-the-arc seam tracking technique. FIGS. 4A and 4B illustrate GMA welding scenarios that result in "reference less" arcs that do not lend themselves to the adaptation and use of the conventional thru-the-arc seam tracking technique.

The inventors have (e.g., via their experiences with GMA welding thick joints with the GMA welding in the buried-arc mode and understanding of the arc/molten-pool dynamics during arc welding as well as thru-the-arc seam tracking with Aluminum alloys), arrived at a concept that enables the use of a thru-the-arc seam tracking technique with seemingly "reference less" set ups for the arc, which involve: a) very large welds produced through deposition of very large molten pools; b) limited torch oscillation amplitude (e.g., 0.016-0.25 in.) relative to joints and/or c) the absence of sidewall(s) that conventionally would be essential for use of the seam tracking technique with the GMAW and GTAW processes.

Figure 3A:
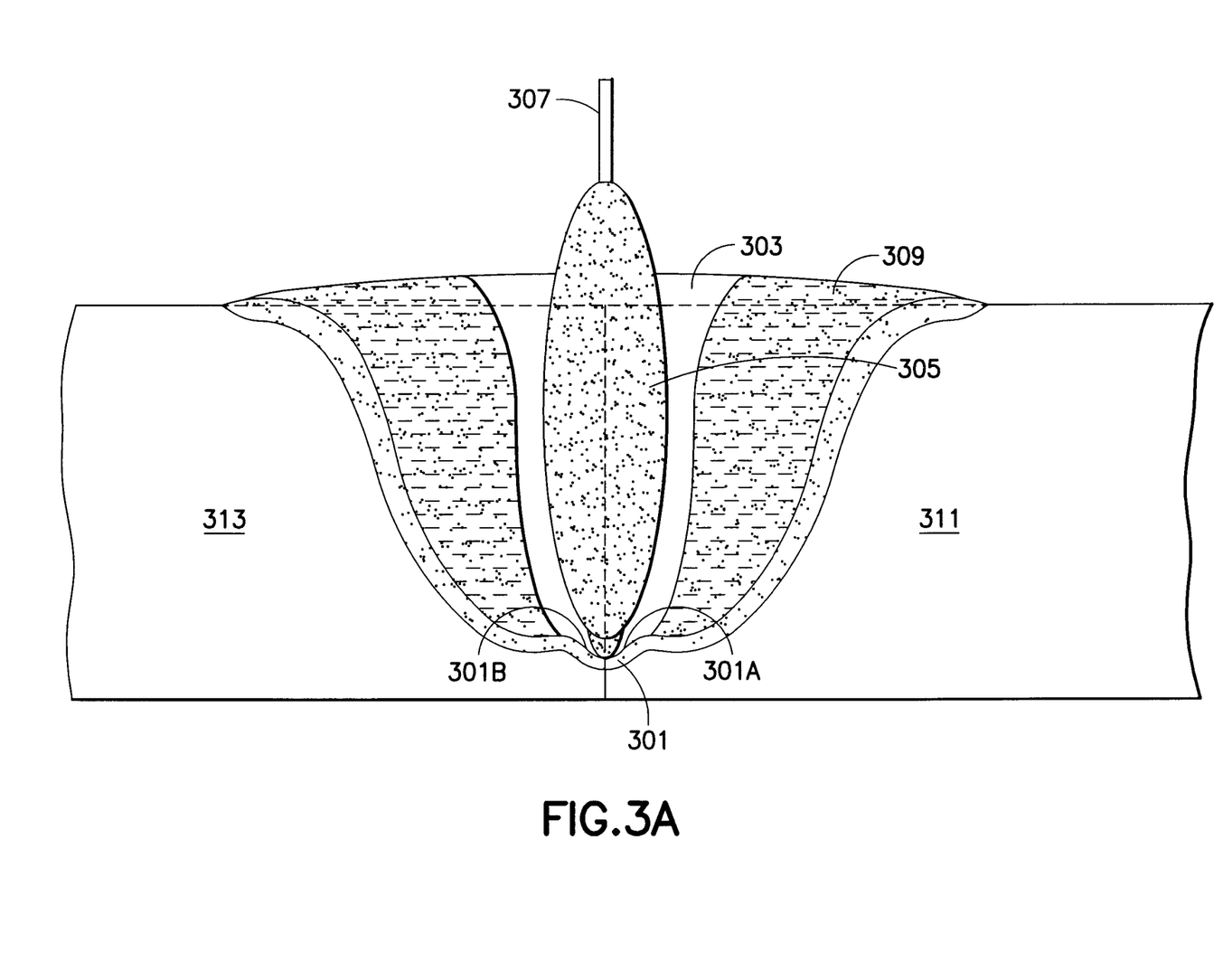
FIGS. 3A and 3B show, respectively: (3A) the formation of the partially molten "ravine" 301 at the bottom of the "keyhole" 303 (cavity), associated with the buried-arc welding mode, on which an embodiment of the invention related to thru-the-arc seam tracking with this mode is based (see, FIG. 3B); and (3B) principle of an embodiment of the invention for thru-the-arc seam tracking with the buried-arc welding mode, based on using the edges 301A,301B of the partially molten ravine 301 deep within the keyhole 303, as "obstructions" (or reference points) for the position of the arc 305 in this embodiment (such obstruction(s) or reference point(s) may comprise one or more interior portions of ravine 301 and/or one or more "shoulders" of the ravine 301 (that is, such a shoulder being the interface at the top of ravine 301 where ravine 301 forms in the bottom of the cavity 303)). As the arc 305 is laterally oscillated and placed closer to or onto an edge of the ravine 301 (see 301A of FIG. 3B), the arc 305 shortens and changes the welding voltage and current at this local. As seen, electrode 307 is used and arc 305 produces molten pool 309 in plate A 311 and plate B 313. Of note, the partially molten ravine 301 at the bottom of the keyhole 303 did not exist prior to application of arc 305 (rather, the partially molten ravine 301 and the keyhole 303 are formed after application of arc 305). In this regard, reference is directed to the dashed lines at the interface between plate A 311 and plate B 313—showing that these two plates had originally abutted one another with no gap between the two (in another example, the present invention may be used when there is a gap or the like between plates). As will be understood, these
Figure 3B:
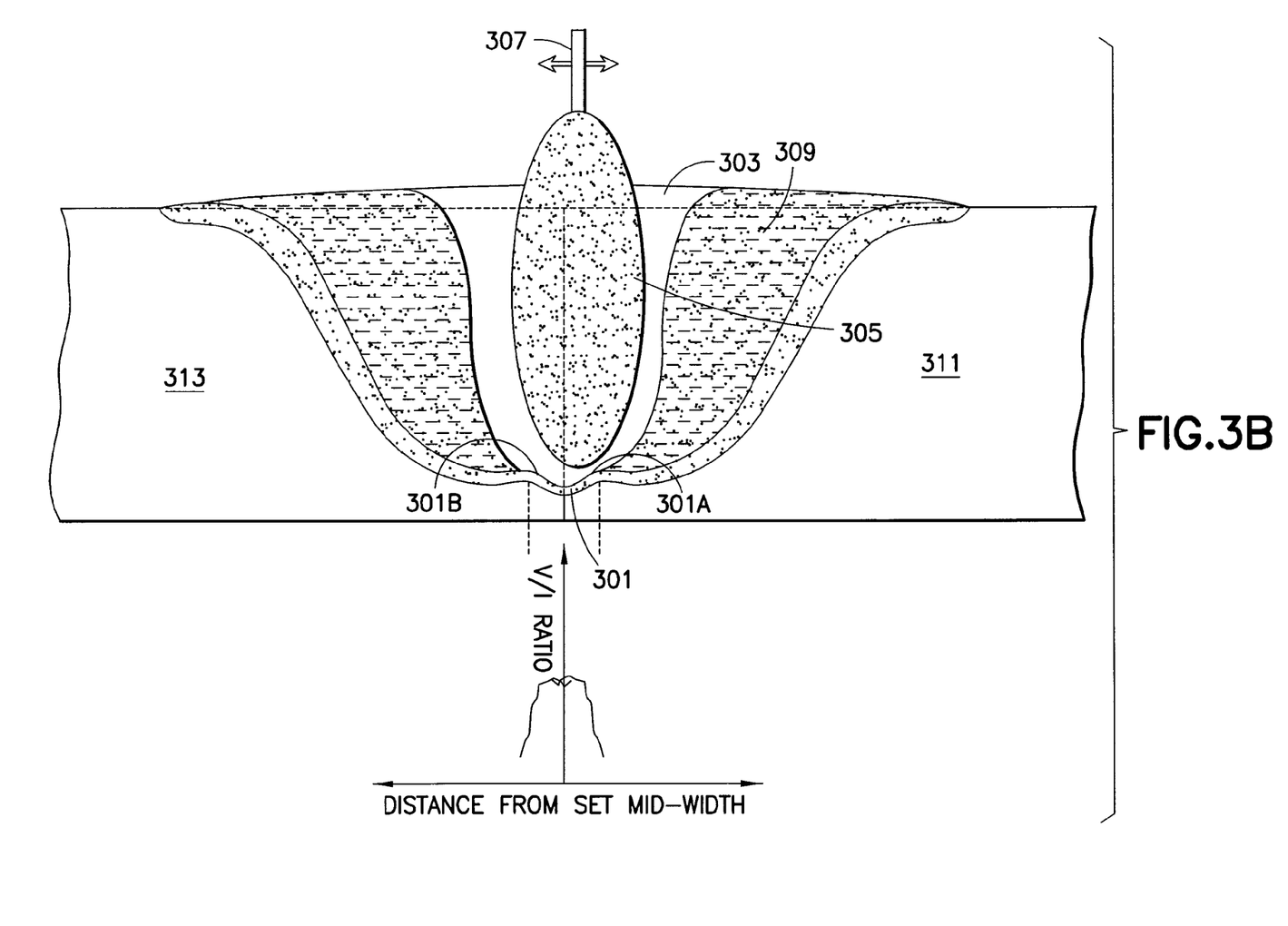

With reference now to FIGS. 3A and 3B, in one embodiment of the present invention the inventors have experimentally demonstrated that by welding in the buried-arc mode, it is possible to create, for example, two (e.g., left and right) reliable "obstructions" for the arc 305 at the bottom of the "keyhole" 303 (or cavity) formed by the deeply penetrating "collimated" (constricted) arc 305 within the molten pool 309. As the arc 305 is oscillated laterally relative to the seam being welded, the arc 305 is forced to be shortened as it gets closer to (or onto) the partially molten edges 301A,301B of the ravine 301 at the bottom of the keyhole 303, which act as "obstructions". The ravine 301 (or depression) is formed by partially melting the top edges of the parts, at the joint, facing the end of the "collimated" arc deep within the molten pool. When welding in the buried-arc mode this ravine 301 forms regardless of whether the joint is closed (i.e., no gap between adjacent parts) or opened (with a gap between adjacent parts). The concept of thru-the-arc-seam tracking with the buried-arc mode is implemented in this embodiment by measuring the changes in welding voltage and current as the arc 305 momentarily shortens about the left and right side-walls of the ravine 301 at the bottom of the keyhole 303 and the ratios between these electric values (e.g., V/I-Impedance) are integrated with all the values measured to the right and left of the seam's set mid-width and compared to the estimated values that should attain the targeted depth of fusion into the edges of the parts being welded.

The formation and use of the partially molten left and right-edges of the ravine 301 as obstructions from which the lateral positions of the arc 305 relative to the seam can be referenced, electrically, is made possible in this embodiment by the fact that the melting of part edges at a joint is more localized (or confined) to these edges than when welding over solid parts (bead on plate) with which the "ravine" never forms. This stems from the facts that: a) the edges of the parts about the joint have a more limited capability to conduct heat away from the welding region (i.e., arc and molten pool) compared to the capability of solid parts—this in turn localizes the melting of these edges about the joint; and b) the edges of the parts are directly subjected to the arc force, which helps to "round" them off upon melting and form the "ravine". These in conjunction with the pre-determined trajectory (e.g., by mechanized, robotic and/or computer controlled mechanism) of the arc over the joint, may be used in one embodiment of this seam tracking concept.

As discussed above, FIGS. 3A and 3B, for example, present an embodiment of this concept of thru-the-arc seam tracking with the buried-arc welding mode.

Further, FIGS. 5-8 depict results of a demonstration carried out using an embodiment of this concept of thru-the-arc seam tracking with the buried-arc welding mode (the demonstration was carried out by buried-arc GMA welding partial-penetration Square-Butt joints without a gap, at corner joints between 1 in. thick 5083-0 plates, using the following welding parameters:

Welding Position—Flat Down hand with a 50 tilt angle of joint from Horizontal
 Wire Diameter—3/16 in.
 Torch Work Angle—00
 Torch Travel Angle—70° from Horizontal
 Torch Height about the joint—1.5 in.
 Torch Oscillation Width—0.06 in.
 Welding speed of travel—11 ipm
 Welding Current—450 Amperes
 Welding Voltage—33-35 Volts
 Argon Flow Rate—150 CFH
 Helium Flow Rate—200 CFH In another example, various embodiments of the present invention may be applied to welding with all welding processes that can operate in the buried-arc mode (e.g. GTAW, GMAW, etc.) while using thru-the-arc seam tracking.

In another example, various embodiments of the present invention may be applied to welding with the GMAW, Hot-Wire GTAW (HWGTAW), Cold-Wire GTAW (CWGTAW) autogenously (without addition of filler wire) GTAW, Plasma welding (PW), and/or Submerged Arc Welding (SAW) processes, with which the welding arc is "buried" within the molten pool and penetrates through it to the extent that the end of the arc impinges directly onto the edges of the parts, at the joint, and thus forms the "ravine".

In another example, various embodiments of the present invention may be applied to thru-the-arc seam tracking with seemingly "reference less" arcs.

In another example, under various embodiments of the present invention lateral oscillation of the arc relative to the seam may be accomplished by oscillation of the torch and/or electromagnetically.

In another example, various embodiments of the present invention may be applied to welding any desired materials, such as, for example, Aluminum, Steels, Stainless-Steels, Titanium, etc.

In another example, various embodiments of the present invention may be applied to welding all variations of Square-Butt and Lap-Fillet type joints (e.g. corners, etc.).

In another example, various embodiments of the present invention may be applied to combined use of the thru-the-arc seam tracking technique in conjunction with automatic voltage control (AVC), which maintains arc length constant—for example, when buried-arc welding with GTAW and Plasma based processes.

In another example, various embodiments of the present invention may be applied to welding joints with and without gaps.

As discussed herein, under various embodiments of the present invention the thru-the-arc seam tracking technique may be accomplished with the buried-arc welding mode by using the partially molten edges of the "ravine", formed deeply within the molten pool at the end of the "keyhole" (cavity), as "obstructions" against which to reference the lateral position of the arc relative to the joint being welded.

In this regard, various advantages of buried-arc welding relatively thick joints with thru-the-arc seam tracking according to various embodiments of the present invention may include (but not be limited to) the following:

Improved accuracy of placing of the arc and/or wire tip relative to the joints being buried-arc welded, which in turn will typically yield more consistent weld quality, reduced amount of weld re-work and improved weld repeatability.

Reduced dependency on torch placement accuracy and repeatability by the welding machine, relative to joints.

Relaxed dimensional tolerance requirements of parts and subassemblies.

Increased operator comfort and reduced exposure to arc-radiation.

Increased productivity achieved by a more self-guiding buried-arc welding system, typically requiring less operator attention and involvement (e.g. less adjustment of torch position relative to the joint, etc.).

Realization of the benefits of welding in the buried-arc mode under more controlled conditions. Various advantages of welding in this mode may include (but are not limited to):

Significant reduction in weld induced distortion.

Significant increase in weld productivity, achieved by deposition of smaller number of weld passes than with the other arc welding processes.

Reduced amount of required welding filler wire.

In some cases, reduced cost of joint preparation.

In another embodiment, a method of gas metal buried-arc welding with through the arc seam tracking may be provided, comprising: positioning at least a portion of a first metal component in an abutting relationship with at least a portion of a second metal component (with no gap between the two metal components or with a gap between the two metal components—such gap being disposed between opposed facing sidewalls of the metal components); establishing an arc between a metal electrode (e.g., a consumable metal electrode) and the components being welded, the welding current supporting and passing through the arc and a welding voltage determined at least in part by the resistance of the electrode and arc to the current passing through them; depositing metal (e.g., from the electrode to the components and/or from a filler wire to the components) and producing a pool of molten metal in a cavity formed at least partially within the first metal component and the second metal component, the cavity being produced by the welding and the cavity having sidewalls, a "ravine" like bottom and a width; moving the arc and the electrode, thereby also moving the cavity, along the abutting relationship to produce a welded joint; oscillating the welding arc (e.g., essentially perpendicular to the welded joint) at least partially within the cavity at a frequency and amplitude relative to the sidewalls of the cavity, the "ravine" at the bottom of this cavity and the mid-width of the cavity, wherein the arc melts and penetrates at least a portion of the sidewalls of the cavity; calculating an electrical impedance of the arc; measuring (e.g., continuously measuring) the voltage and current of the arc, as affected by the changes in the arc length as determined by its position relative to the "ravine" at the bottom of the cavity (and/or the sidewalls of the cavity); calculating electrical impedances corresponding to specific voltage and current measurements; mapping the position of the arc (e.g., at any instance) based on the electrical impedances calculated at specific voltage and current measurements; calculating the electrical impedance at the mid-width of the cavity; calculating a slope value for the impedance on each side of the mid-width of the cavity; integrating the electrical impedance over a portion of the width of the cavity; estimating the position of the arc relative to the "ravine" at the bottom of the cavity (and/or the sidewalls of the cavity); computing the approximate position of the arc relative to the mid-width of the cavity that will yield a targeted depth of penetration of the arc into the sidewalls of the cavity; and automatically changing the lateral position of the arc and/or the oscillation amplitude to achieve a targeted depth of penetration of the arc into the sidewalls of the cavity.

Of note, regarding mapping of the impedance values, in this embodiment they are generated while welding (as opposed, for example, to being obtained during a trial run and replayed on subsequent passes). In one example, the tracking system of this embodiment may use the last, e.g., 20 oscillation cycle impendence maps as an input to a fuzzy-logic tracking algorithm to generate a feed forward control loop for the torch height and width control functions.

In one example, the method may comprise calculating a trend value for the mid-width impedance values over multiple oscillation cycles.

In another example, the method may comprise estimating the position of the arc relative to the "ravine" at the bottom of the cavity and the contact tip.

In another example, the method may comprise changing (e.g., automatically changing) the vertical position of the arc to achieve a targeted torch-to-work vertical distance.

In another embodiment of the present invention a method of welding is provided, comprising: forming an arc between an electrode and a metal material, wherein the metal material has a work surface, wherein the arc produces a cavity in the metal material, wherein the cavity extends into the metal material below the work surface, wherein the cavity has a bottom, and wherein the arc further produces a ravine at the bottom of the cavity; and detecting at least one reference point associated with the metal material, wherein the reference point is below the work surface and is defined at least in part by the ravine produced by the arc at the bottom of the cavity.

In one example, the reference point may comprise a point at an interior portion of the ravine (see, e.g., FIGS. 3A and 3B).

In another example, the reference point may comprise a point at a shoulder of the ravine at an interface between a top of the ravine and a bottom of the cavity (see, e.g., FIGS. 3A and 3B).

In another example, the step of detecting the reference point may be carried out by determining a change in at least one characteristic of the arc.

In another example, the characteristic of the arc may be a length of the arc.

In another example, the characteristic of the arc may be an impedance of the arc.

In another example, a position of the arc may be controlled based at least in part upon the detected reference point.

In another example, a position of the arc may be controlled (e.g., based at least in part upon the detected reference point) to achieve a targeted depth of penetration of the arc into the metal material.

In another example, the arc may be formed in at least a portion of a first metal component and in at least a portion of a second metal component, wherein the first metal component may be disposed next to the second metal component.

In another example, a position of the arc may be controlled (e.g., based at least in part upon the detected reference point) to achieve a targeted depth of penetration of the arc into at least a portion of the first metal component and in at least a portion of the second metal component.

In another example, there may be no gap between the first metal component and the second metal component and the arc may be disposed within the gap.

In another example, there may be a gap between the first metal component and the second metal component.

In another example, the electrode may be a consumable electrode.

In another example, the method may further comprise utilizing filler wire to deposit additional metal.

In another embodiment of the present invention a method of welding is provided, comprising: forming an arc between an electrode and a metal material, wherein the metal material has a work surface, wherein the arc produces a cavity in the metal material, wherein the cavity extends into the metal material below the work surface, wherein the cavity has a bottom, and wherein the arc further produces a ravine at the bottom of the cavity; moving the arc along the metal material in a first direction, wherein the arc produces an elongated cavity and an elongated ravine at the bottom of the cavity; oscillating the arc in a second direction, wherein the second direction is distinct from the first direction; detecting, based at least in part upon the oscillation, at least a first reference point associated with the metal material, wherein the first reference point is below the work surface and is defined at least in part by the ravine produced by the arc at the bottom of the cavity; detecting, based at least in part upon the oscillation, at least a second reference point associated with the metal material, wherein the second reference point is distinct from the first reference point, and wherein the second reference point is below the work surface and is defined at least in part by the ravine produced by the arc at the bottom of the cavity.

In one example, at least one of the first reference point and the second reference point may comprise a point at an interior portion of the ravine (see, e.g., FIGS. 3A and 3B).

In another example, each of the first reference point and the second reference point may comprise a point at an interior portion of the ravine, wherein the point at the interior portion of the ravine associated with the first reference point is distinct from the point at the interior portion of the ravine associated with the second reference point (see, e.g., FIGS. 3A and 3B).

In another example, at least one of the first reference point and the second reference point may comprise a point at a shoulder of the ravine at an interface between a top of the ravine and a bottom of the cavity (see, e.g., FIGS. 3A and 3B).

In another example, each of the first reference point and the second reference point may comprise a point at the shoulder of the ravine at an interface between a top of the ravine and a bottom of the cavity, wherein the point at the shoulder of the ravine at an interface between a top of the ravine and a bottom of the cavity associated with the first reference point is distinct from the point at the shoulder of the ravine at an interface between a top of the ravine and a bottom of the cavity associated with the second reference point (see, e.g., FIGS. 3A and 3B).

In another example, the step of detecting the first reference point may be carried out by determining a change in at least one characteristic of the arc and wherein the step of detecting the second reference point may be carried out by determining a change in at least one characteristic of the arc.

In another example, the characteristic of the arc may be a length of the arc.

In another example, the characteristic of the arc may be an impedance of the arc.

In another example, a position of the arc may be controlled based at least in part upon at least one of the detected first reference point and the detected second reference point.

In another example, the position of the arc may be controlled based at least in part upon each of the detected first reference point and the detected second reference point.

In another example, a position of the arc may be controlled (e.g., based at least in part upon one or more of the first detected reference point and the second detected reference point) to achieve a targeted depth of penetration of the arc into the metal material.

In another example, the position of the arc along a lateral direction essentially perpendicular to the elongated cavity and the elongated ravine at the bottom of the cavity may be controlled based at least in part upon each of the detected first reference point and the detected second reference point.

In another example, the second direction may be essentially perpendicular to the first direction.

In another example, the arc may be formed in at least a portion of a first metal component and in at least a portion of a second metal component, wherein the first metal component may be disposed next to the second metal component.

In another example, a position of the arc may be controlled (e.g., based at least in part upon one or more of the first detected reference point and the second detected reference point) to achieve a targeted depth of penetration of the arc at least a portion of the first metal component and in at least a portion of the second metal component.

In another example, there may be no gap between the first metal component and the second metal component.

In another example, there may be a gap between the first metal component and the second metal component and the arc may be disposed within the gap.

In another example, the electrode may be a consumable electrode.

In another example, the method may further comprise utilizing filler wire to deposit additional metal.

As discussed herein, various embodiments of the present invention may provide the following solution for the following problem:

Problem: When welding, for example, thick metal plates, there can be so much molten metal that the seam edges can not be used for arc position registration in a conventional thru-the-arc seam tracking process.

Solution: Use reference points within the seam, for example, edges of a ravine formed in the molten pool at the bottom of the seam, against which to reference the lateral position of the arc relative to the joint being welded. That is, in various embodiments, the present invention may, rather than use externalized reference surfaces, utilize one or more internalized reference surfaces (e.g., internal to the molten pool of metal).

In another example, the steps may be carried out in the order recited.

In another example, the method may be a computer-implemented method (e.g., implemented using one or more programmed processors).

In another example, the method may be carried out at least in part by an automated welding machine.

For the purposes of this disclosure, a computer readable medium is a medium that stores computer data in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

Further, the present invention may, of course, be implemented using any appropriate computer readable medium, computer hardware and/or computer software.

Of note, the welding techniques described herein may, of course, be computer implemented (e.g., for controlling arc movement, arc length, arc power, torch height, and/or carrying out calculations) and may utilize any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used, and the type of computer programming languages that may be used. The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain welding techniques may have been described herein as being "computer implementable" or "computer implemented". In this regard, it is noted that while such methods can be implemented using a computer, the methods do not necessarily have to be implemented using a computer. Further, the various steps may be carried out in any desired order (and any desired steps may be added and/or any desired steps may be eliminated).

What is claimed is:

1. A method of welding, comprising:
   forming an arc between an electrode and a metal material,
   moving the arc along the metal material along a seam in a first direction, wherein the arc produces an elongated cavity and a first obstruction and a second obstruction;
   oscillating the arc in a second direction, wherein the second direction is distinct from the first direction and lateral to the seam;
   detecting at least a first reference point on the first obstruction, wherein the first obstruction is within a molten pool and on a first side of the seam relative to the weld direction; and
   detecting at least a second reference point on the second obstruction wherein the second obstruction is within the molten pool and on a second side of the seam, opposite the first side of the seam relative to the weld direction.

2. The method of claim 1, wherein the step of detecting the first reference point is carried out by determining a change in at least one characteristic of the arc.

3. The method of claim 2, wherein the characteristic of the arc is a length of the arc.

4. The method of claim 2, wherein the characteristic of the arc is an impedance of the arc.

5. The method of claim 1, wherein a position of the arc is controlled based at least in part upon the detected first reference point.

6. The method of claim 1, wherein the arc is formed in at least a portion of a first metal component and in at least a portion of a second metal component, wherein the first metal component is disposed next to the second metal component.

7. The method of claim 6, wherein there is no gap between the first metal component and the second metal component and the arc is disposed within the gap.

8. The method of claim 6, wherein there is a gap between the first metal component and the second metal component.

9. The method of claim 1, wherein the electrode is a consumable electrode.

10. The method of claim 1, further comprising utilizing filler wire to deposit additional metal.

11. The method of claim 1, wherein a position of the arc is controlled based at least in part upon at least one of the detected first reference point and the detected second reference point.

12. The method of claim 1, wherein the position of the arc is controlled based at least in part upon each of the detected first reference point and the detected second reference point.

13. The method of claim 12, wherein the position of the arc along a lateral direction essentially perpendicular to the elongated cavity and the molten pool at the bottom of the cavity is controlled based at least in part upon each of the detected first reference point and the detected second reference point.

14. The method of claim 1, wherein the second direction is essentially perpendicular to the first direction.

15. The method of claim 1, wherein the steps are carried out in the order recited.

* * * * *